United States Patent
Yoshiki

(10) Patent No.: US 9,971,461 B2
(45) Date of Patent: May 15, 2018

(54) OPTICALLY TRANSPARENT CONDUCTIVE MATERIAL

(71) Applicant: Mitsubishi Paper Mills Limited, Sumida-ku, Tokyo (JP)

(72) Inventor: Takenobu Yoshiki, Sumida-ku (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 101 days.

(21) Appl. No.: 14/650,949

(22) PCT Filed: Dec. 9, 2013

(86) PCT No.: PCT/JP2013/082952
§ 371 (c)(1),
(2) Date: Jun. 10, 2015

(87) PCT Pub. No.: WO2014/103679
PCT Pub. Date: Jul. 3, 2014

(65) Prior Publication Data
US 2015/0309617 A1    Oct. 29, 2015

(30) Foreign Application Priority Data
Dec. 27, 2012  (JP) .................................. 2012-284892

(51) Int. Cl.
*G06F 3/041* (2006.01)
*G06F 3/044* (2006.01)
*G06F 3/046* (2006.01)

(52) U.S. Cl.
CPC .............. *G06F 3/044* (2013.01); *G06F 3/046* (2013.01); *G06F 2203/04103* (2013.01)

(58) Field of Classification Search
CPC . G06F 3/02; G06F 3/041; G06F 3/045; G06F 3/042; G09G 5/00; G01R 27/26; G06K 11/06; G08C 21/00
See application file for complete search history.

(56) References Cited

U.S. PATENT DOCUMENTS

2002/0033494 A1 * 3/2002 Ozaki ............... H01L 27/11502
257/295
2009/0277672 A1    11/2009 Matsumoto
(Continued)

FOREIGN PATENT DOCUMENTS

CN    102216891    10/2011
JP    2003-077350   3/2003
(Continued)

*Primary Examiner* — Pegeman Karimi
(74) *Attorney, Agent, or Firm* — Fitzpatrick Cella Harper and Scinto

(57) ABSTRACT

Provided is an optically transparent conductive material which has low visibility and reduced occurrence of short circuit and therefore is suitable as an optically transparent electrode for projected capacitive touchscreens. The optically transparent conductive material has, on a base material, a sensor part composed of a metal pattern electrically connected to a terminal part and a dummy part composed of a metal pattern not electrically connected to the terminal part. When a line dividing the sensor part and the dummy part is referred to as an imaginary boundary line, the metal pattern of the sensor part and/or the metal pattern of the dummy part is displaced along the imaginary boundary line.

6 Claims, 3 Drawing Sheets

(56) References Cited

U.S. PATENT DOCUMENTS

| | | | |
|---|---|---|---|
| 2010/0123670 A1 | 5/2010 | Philipp | |
| 2011/0018838 A1* | 1/2011 | Lee | G06F 3/044 345/174 |
| 2013/0278513 A1* | 10/2013 | Jang | G06F 3/044 345/173 |
| 2016/0231836 A1* | 8/2016 | Kuo | H03K 17/962 |
| 2016/0334907 A1* | 11/2016 | Ishizaki | G06F 3/044 |

FOREIGN PATENT DOCUMENTS

| | | |
|---|---|---|
| JP | 2005250169 | 9/2005 |
| JP | 2006-344163 | 12/2006 |
| JP | 2007-188655 | 7/2007 |
| JP | 2007-287953 | 11/2007 |
| JP | 2007-287994 | 11/2007 |
| JP | 2011-059771 | 3/2011 |
| JP | 2011-253263 | 12/2011 |
| JP | 2012-243119 | 12/2012 |

* cited by examiner

OPTICALLY TRANSPARENT CONDUCTIVE MATERIAL

This application is a national phase of PCT Application No. PCT/JP2013/082952 filed Dec. 9, 2013, which in turn claims benefit of Japanese Application No. 2012-284892 filed Dec. 27, 2012.

TECHNICAL FIELD

The present invention relates to an optically transparent conductive material used for touchscreens, organic EL materials, solar cells, etc., and, in particular, to an optically transparent conductive material preferably used for projected capacitive touchscreens.

BACKGROUND ART

In electronic devices, such as personal digital assistants (PDAs), laptop computers, office automation equipment, medical equipment, and car navigation systems, touchscreens are widely used as their display screens that also serve as input means.

There are a variety of touchscreens that utilize different position detection technologies, such as, optical, ultrasonic, surface capacitive, projected capacitive, and resistive technologies. A resistive touchscreen has a configuration in which an optically transparent conductive material and a glass plate with an optically transparent conductive layer are separated by spacers and face each other. A current is applied to the optically transparent conductive material and the voltage of the glass plate with an optically transparent conductive layer is measured. In contrast, a capacitive touchscreen has a basic configuration in which an optically transparent conductive layer is provided on a base material and there are no movable parts. Capacitive touchscreens are used in various applications due to their high durability and high transmission. Further, projected capacitive technology has an advantage of simultaneous multipoint detection, and therefore is widely used for smartphones, tablet PCs, etc.

As optically transparent conductive material for touchscreens, those having an optically transparent conductive layer made of ITO (indium tin oxide) on a base material have been commonly used. However, since an optically transparent conductive layer made of ITO has high refractive index and high surface light reflectivity, the total light transmittance of an optically transparent conductive material utilizing the optically transparent conductive layer made of ITO is unfavorably low. In addition, due to low flexibility, the optically transparent conductive layer made of ITO is prone to crack when bent, resulting in increased electric resistance of the optically transparent conductive material.

As an alternative to the optically transparent conductive material having an optically transparent conductive layer made of ITO formed on a base material, an optically transparent conductive material obtained by a semi-additive method for forming a metal pattern, the method comprising forming a thin catalyst layer on a base material, forming a resist pattern on the catalyst layer, forming a laminated metal layer in an opening of the resist layer by plating, and finally removing the resist layer and the base metal protected by the resist layer, is disclosed in, for example, Patent Literature 1 and Patent Literature 2.

Also, in recent years, a method in which a silver halide diffusion transfer process is employed and a photosensitive material is used as a precursor to a conductive material has been proposed. For example, Patent Literature 3, Patent Literature 4, and Patent Literature 5 disclose a technology for forming a metal silver pattern by a reaction of a conductive material precursor having a physical development nucleus layer and a silver halide emulsion layer in this order on a base material with a soluble silver halide forming agent and a reducing agent in an alkaline fluid. The patterning by this method can reproduce uniform line width. In addition, due to the highest conductivity of silver among all metals, a thinner line with a higher conductivity can be achieved as compared with other methods. An additional advantage is that a silver pattern obtained by this method has a higher flexibility, i.e., a longer flexing life as compared with an optically transparent conductive layer made of ITO.

In the aforementioned projected capacitive touchscreen, two optically transparent conductive materials on each of which a plurality of sensor parts are patterned in the same plane are joined together, and the two serves as a touch sensor. If such a touch sensor is composed of only a plurality of sensors, the sensor part is conspicuous. In an attempt to avoid this, a dummy part that is not electrically connected to the sensor part is arranged in a place other than the sensor part. However, while in operation, an operator of a touchscreen usually keeps staring at the display, and as a result tends to recognize the difference between the sensor part and the dummy part (highly visible), having a feeling of strangeness. In particular, a projected capacitive touchscreen produced with use of an optically transparent conductive material having a metal pattern on its base material markedly has the problem of the visibility of the sensor part and the dummy part.

To address this problem, in Patent Literature 6, a grid-like metal pattern is divided by a slit (belt-like portion without the metallic pattern) into a sensor part and a dummy part, and for the purpose of reducing the visibility, the slit width is in a range from 20 µm to the maximum dimension of the grid, and the slit is provided so as not to pass through any intersection of the grid. However, even if the slit width is 20 µm, the outline of the sensor part is visually recognized. In addition, even if the slit does not pass through any intersection of the grid, the visibility cannot be sufficiently reduced. Further, since a projected capacitive touchscreen generally has a structure in which a plurality of optically transparent electrodes are arranged in parallel on the same plane of a base material, the optically transparent electrodes in parallel to each other have a risk of short circuit.

Patent Literature 7 suggests a non-linear slit for a lower visibility than that of a linear slit, but this attempt also cannot sufficiently improve the visibility. Also, this method cannot solve the aforementioned problem of short circuit. In Patent Literature 8, the dummy part is formed of dots so that the sensor part and the dummy part have the same total light transmittance and as a result the same level of visibility. However, the metal pattern and the dots are different patterns, and therefore, an operator staring the touchscreen tends to recognize the difference, having a feeling of strangeness. Further, in cases of a metal pattern having a combination of minute dots and thin lines, due to halation that occurs in the exposure performed for metal pattern formation, a produced image may have a different size from designed values, resulting in unfavorable visibility.

CITATION LIST

Patent Literature

Patent Literature 1: JP 2007-287994 A
Patent Literature 2: JP 2007-287953 A

Patent Literature 3: JP 2003-77350 A
Patent Literature 4: JP 2005-250169 A
Patent Literature 5: JP 2007-188655 A
Patent Literature 6: JP 2006-344163 A
Patent Literature 7: JP 2011-59771 A
Patent Literature 8: JP 2011-253263 A

SUMMARY OF INVENTION

Technical Problem

An object of the present invention is to provide an optically transparent conductive material which has low visibility and reduced occurrence of short circuit and therefore is suitable as an optically transparent electrode for capacitive touchscreens.

Solution to Problem

The above object of the present invention will be basically achieved by an optically transparent conductive material having, on a base material, a sensor part composed of a metal pattern electrically connected to a terminal part and a dummy part composed of a metal pattern not electrically connected to the terminal part, the conductive material being characterized in that, when a line dividing the sensor part and the dummy part is referred to as an imaginary boundary line, the metal pattern of the sensor part and/or the metal pattern of the dummy part is displaced along the imaginary boundary line.

The sensor part and the dummy part are preferably each composed of a metal pattern having repeated unit graphics. The unit graphic of the metal pattern of the sensor part and the unit graphic of the metal pattern of the dummy part are preferably congruent. It is preferred that the unit graphic is a square or a lozenge and that the interval between the lines of the unit graphic is 400 μm or less.

The line width of the metal pattern is preferably 1 to 10 μm.

The distance of displacement of the metal pattern of the dummy part, which metal pattern is discontinuous with the metal pattern of the sensor part, along the imaginary boundary line (see FIG. 2) is preferably equal to or more than the line width of each side constituting the unit graphic of the dummy part and the sensor part and equal to or less than 100 μm, and more preferably equal to or more than 1.5 times the line width of each side constituting the unit graphic of the dummy part and the sensor part and equal to or less than 40 μm.

Preferably, the metal pattern of the sensor part and the metal pattern of the dummy part do not overlap and there is no non-image area between the metal pattern of the sensor part and the metal pattern of the dummy part.

When a line dividing the dummy part into multiple areas is referred to as another imaginary boundary line, the metal pattern of the dummy part in an area is preferably displaced, along this imaginary boundary line, relative to the other area sharing the boundary line.

Advantageous Effects of Invention

The present invention can provide an optically transparent conductive material which has low visibility and reduced occurrence of short circuit and therefore is suitable as an optically transparent electrode for projected capacitive touchscreens.

DESCRIPTION OF EMBODIMENTS

Hereinafter, the present invention will be illustrated with reference to drawings, but it is needless to say that the present invention is not limited thereto and various alterations and modifications may be made without departing from the technical scope of the invention.

Figure 1:
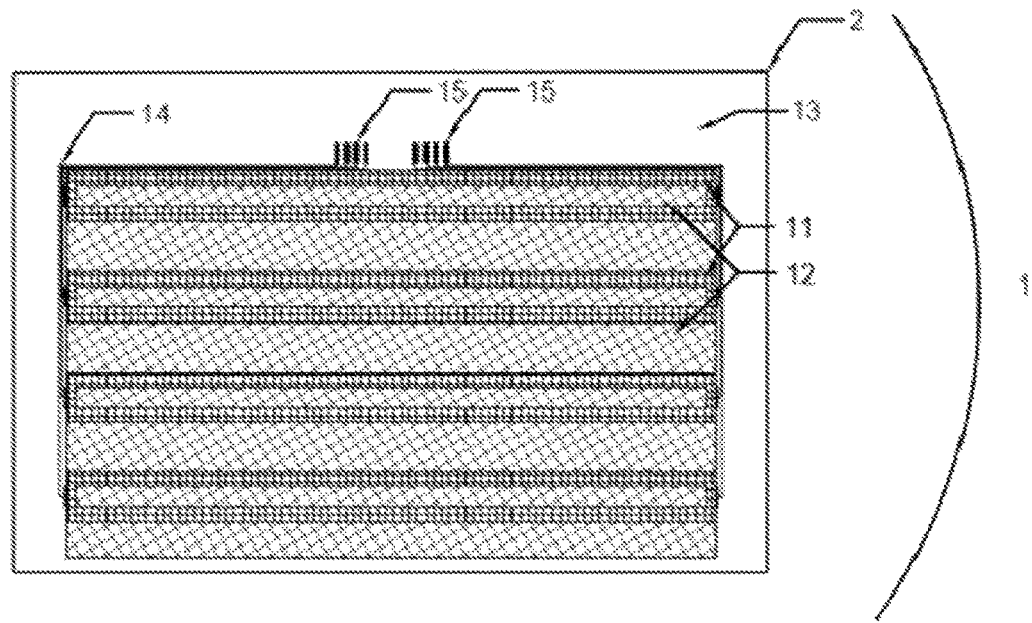
FIG. 1 is a schematic plan view showing an example of the optically transparent conductive material of the present invention.

FIG. 1 is a schematic plan view showing an example of the optically transparent conductive material of the present invention. In FIG. 1, an optically transparent conductive material 1 of the present invention has, on a base material 2, a sensor part 11 which has optical transparency and is composed of a metal pattern and a dummy part 12 which also has optical transparency and is composed of a metal pattern. The sensor part 11 is connected, via a wiring part 14, to a terminal part 15. By connecting the terminal part 15 to the outside, the changes in capacitance detected by the sensor part 11 can be captured. The number 13 shows a non-image part. Metal patterns not electrically connected to the terminal unit 15 all serve as dummy parts 12 in the present invention.

Figure 2:
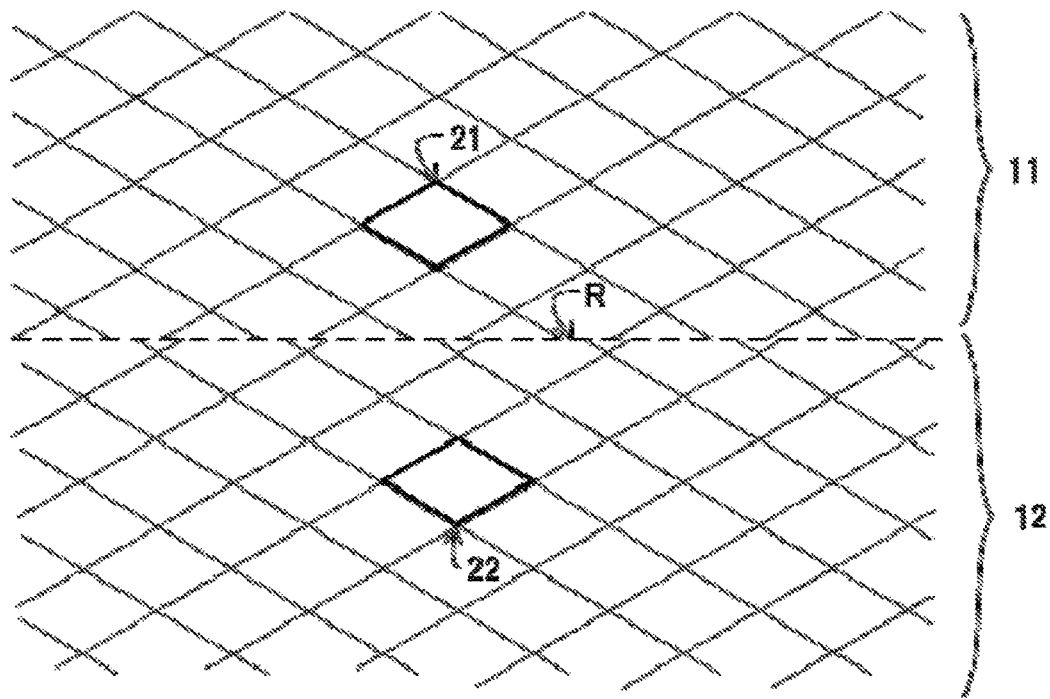
FIG. 2 is an enlarged view of the dummy part and the sensor part of FIG. 1.

FIG. 2 is an enlarged view of the dummy part 12 and the sensor part 11 of FIG. 1. In FIG. 2, the sensor part 11 is composed of a metal pattern having repeated unit graphics 21 (partially shown in a thick line for the purpose of illustration). The unit graphic 21 may be of any known shape and examples thereof include triangles, such as an equilateral triangle, an isosceles triangle, and a right triangle; quadrangles, such as a square, a rectangle, a lozenge, a parallelogram, and a trapezoid; (equilateral) polygons, such as an (equilateral) hexagon, an (equilateral) octagon, an (equilateral) dodecagon, and an (equilateral) icosagon; a circle; an ellipse; and a star. For example, repetition of one of these shapes may be used, and also a combination of two or more of these shapes may be used. Each side of the unit graphic 21 may be not a straight line but a zigzag line, a wavy line, etc. Also, the brick pattern as disclosed in JP 2002-223095 A may also be used. In the present invention, any of these shapes may be used as the unit graphic constituting the metal pattern of the sensor part 11 and the dummy part 12, but the shape of the unit graphic is preferably a square or a lozenge and more preferably a lozenge of which an angle between adjacent two sides is 30 to 70°. The interval between the lines (distance between opposite sides) of the unit graphic 21 is preferably 400 μm or less. The line width thereof is preferably 20 μm or less, more preferably 1 to 15 μm, and still more preferably 1 to 10 μm. In FIG. 2 and the following figures, solid lines are used for actually-existing metal patterns while dashed lines are used for the purpose of illustration and any real metal pattern does not exist there.

In FIG. 2, the dummy part 12 is composed of unit graphics (partially shown in a thick line for the purpose of illustration) which are congruent with the unit graphics 21 constituting the sensor part 11. The metal pattern of the dummy part 12, which pattern is discontinuous with the metal pattern of the sensor part 11, is displaced to the right along an imaginary boundary line R (a line separating the sensor part 11 from the dummy part 12) as shown in FIG. 2. The displacement along the imaginary boundary line R breaks the continuity between the metal patterns of the sensor part 11 and the dummy part 12, and in this constitution, the visual difference between the sensor part 11 and the dummy part 12 is hardly recognizable.

In the present invention, the distance of displacement of the metal pattern of the dummy part 12, which metal pattern is discontinuous with the metal pattern of the sensor part 11, along the imaginary boundary line R is preferably equal to or more than the line width of a side constituting the unit graphic 21 and equal to or less than 100 µm, and more preferably equal to or more than 1.5 times the line width of a side constituting the unit graphic 21 and equal to or less than 40 µm. In FIG. 2, the metal pattern of the dummy part 12, which pattern is discontinuous with the metal pattern of the sensor part 11, is displaced to the right along the imaginary boundary line R. However, the direction of the displacement may be right or left.

In the plane of FIG. 2, if the metal pattern of the dummy part 12 is displaced relative to the metal pattern of the sensor part 11 in a direction not along the imaginary boundary line R, for example, in a direction perpendicular to the boundary line R, problems of visibility and/or short circuit can occur because the displacement produced overlapping of the metal pattern of the sensor part 11 and the metal pattern of the dummy part 12 or a gap without any metal pattern (a non-image area, where no metal patterns exist). For this reason, it is undesirable that the metal pattern of the dummy part 12 is displaced relative to the metal pattern of the sensor part 11 in a direction not along the imaginary boundary line R. Specifically, the distance of the displacement of the metal pattern of the dummy part 12 relative to the metal pattern of the sensor part 11 in a direction not along the imaginary boundary line R is preferably not beyond the line width of the unit graphics 21 and 22. However, as described later referring to FIG. 3, in cases where the overlapping of the metal pattern of the sensor part 11 and the metal pattern of the dummy part 12 is deleted, or a metal pattern in which the gap without any metal pattern is supplemented with a metal pattern is used, the metal pattern of the dummy part 12 may be displaced relative to the metal pattern of the sensor part 11 in a direction not along the imaginary boundary line R.

In FIG. 2, the unit graphic 22 is congruent with the unit graphic 21. In the present invention, the unit graphic 22 being congruent with the unit graphic 21 is most preferred in terms of visibility (for reduced visibility), but complete congruency is not necessary and being almost the same is also preferred. In the present invention, "almost the same" means that both the unit graphics are almost the same in terms of the length of each side, the angle of the grid, the position of each side, and the width of each side, and specifically means that the difference in the length of each side is within the range of ±10%, the difference in the angle of the grid is within the range of ±5°, the difference in the position of each side is within the range of ±10%, and the difference in the thickness of each side (line width) is within the range of ±50%, between the unit graphics.

As shown in FIG. 1, an optically transparent conductive material 1 generally has a plurality of sensor parts 11 and a plurality of dummy parts 12. Therefore, a plurality of boundaries between the sensor parts 11 and the dummy parts 12 exist. In some cases, a dummy part 12 may be provided so as to be surrounded by a sensor part 11. A preferable embodiment of the present invention in such cases will be described referring to FIG. 3.

Figure 3:
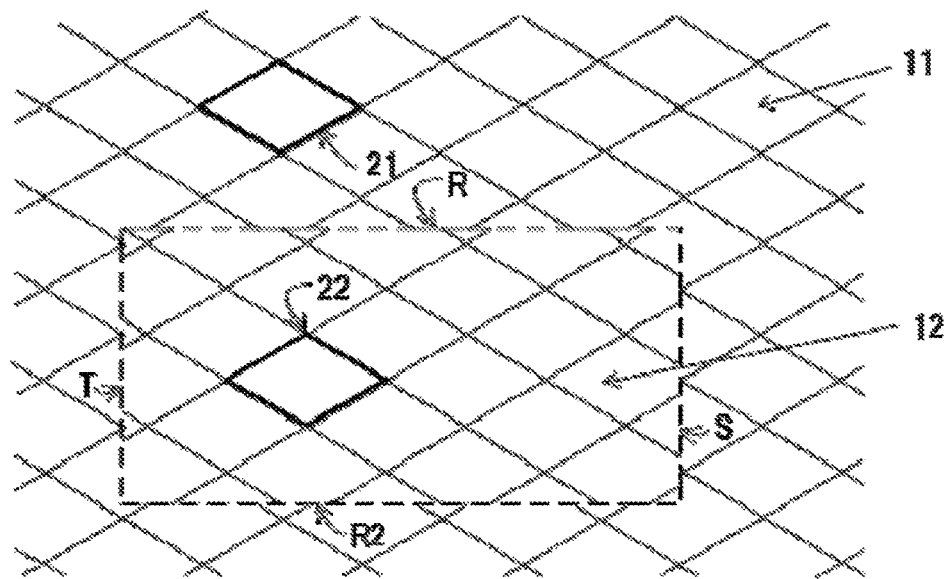
FIG. 3 is a schematic enlarged view showing an example in which a dummy part is surrounded by a sensor part.

FIG. 3 is a schematic enlarged view showing an example in which a dummy part 12 is surrounded by a sensor part 11. In FIG. 3, the dummy part 12 is surrounded by four sides, i.e., imaginary boundary lines R, R2, S, and T, and thus is surrounded by the sensor part 11. The metal pattern of the dummy part 12 which pattern is displaced to the right along the imaginary boundary line R and the imaginary boundary line R2 in parallel to R, and thus is discontinuous with the metal pattern of the sensor part 11. The overlapping produced in such a case, i.e., the overlapping of the metal pattern of the dummy part 12 and the metal pattern of the sensor part 11 in the right side of the imaginary boundary line S in FIG. 3 can be resolved by deleting the metal pattern of a portion of the dummy part 12, the portion having moved beyond the boundary line S. On the other hand, the gap without any metal pattern (a non-image area, where no metal patterns exist) produced in the right side of the imaginary boundary line T can be resolved by supplementing a metal pattern retaining the repetition of the unit lattice 22 constituting the dummy part 12. Thus, in cases where a metal pattern displacement causes the metal pattern constituting the dummy part 12 to enter the sensor part 11, it is preferable to delete the metal pattern in the intruding portion of the dummy part 12, and in cases where a gap is produced in the dummy part 12, it is preferable to supplement the gap with a pattern retaining the repetition of the unit lattice 22 constituting the metal pattern constituting the dummy part 12.

Figure 4:
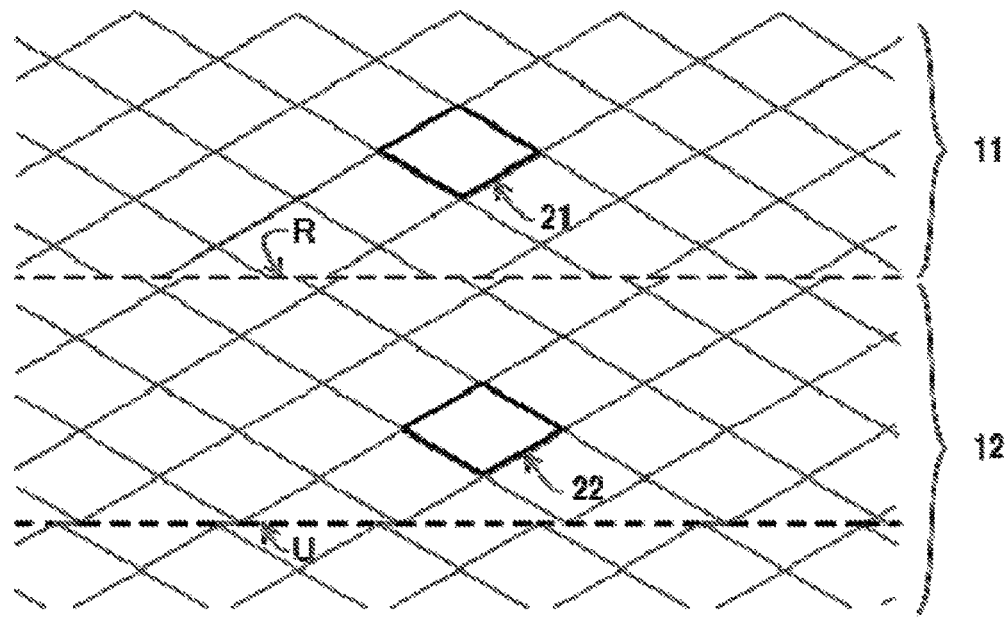
FIG. 4 is a schematic enlarged view showing a part of a preferable optically transparent conductive material of the present invention.

FIG. 4 is a schematic enlarged view showing a part of a preferable optically transparent conductive material of the present invention. In an embodiment of the present invention, it is also preferable that, as shown in FIG. 4, the dummy part 12 is further divided into multiple areas by an additional imaginary boundary line U and the metal pattern is displaced along the imaginary boundary line U.

In the present invention, a broken mesh having a partial line break in the sides thereof can also be used in the dummy part. The line width of the metal thin wire of the unit graphic constituting the dummy part may be within the range of ±50% of the line width of the metal thin wire constituting the sensor part, but is preferably within the range of ±20% and more preferably within the range of ±5%.

In the present invention, the sensor part 11 may be electrically connected by direct contact with the terminal part 15, but is preferably electrically connected with the terminal part 15 via the wiring part 14 as shown in FIG. 1 for assemblage of multiple terminal parts 15.

In the present invention, the metal pattern constituting the sensor part 11, the dummy part 12, the wiring part 14, and the terminal part 15 is preferably made of a metal, in particular, gold, silver, copper, nickel, aluminum, or a composite material thereof. As the method for forming the metal patterns, publicly known methods can be used, and the examples thereof include a method in which a silver halide photosensitive material is used; a method in which, after a silver image is obtained by the aforementioned method, electroless plating or electrolytic plating of the silver image is performed; a method in which screen printing with use of a conductive ink, such as a silver paste and a copper paste, is performed; a method in which inkjet printing with use of a conductive ink, such as a silver ink and a copper ink, is performed; a method in which the metal pattern is obtained by forming a metal layer by evaporation coating or sputtering, forming a resist film thereon, performing pattern exposure, developing, etching, and removing the resist layer; and a method in which the metal pattern is obtained by placing a metal foil, such as a copper foil, forming a resist film thereon, performing pattern exposure, developing, etching, and removing the resist layer. Among them, the method in which a silver halide photosensitive material is used for forming a metal pattern by a silver halide diffusion transfer process is preferred for easily forming an extremely microscopic metal pattern and for obtaining a thinner metal pattern. If the thickness of the metal pattern produced by these procedures is too thick, the following processes may become difficult to carry out, and if the thickness is too thin, the conductivity required of touchscreens can hardly be achieved. Therefore, the thickness is preferably 0.01 to 5 μm, and more preferably 0.05 μm to 1 μm.

As the base material used for the optically transparent conductive material of the present invention, plastics, glass, rubber, ceramics, etc. are preferably used. Preferred are base materials having a total light transmittance of 60% or more. Among plastics, flexible resin films are preferably used because of excellent ease in handling. Specific examples of the resin films used as the base material include resin films made of a polyester resin, such as polyethylene terephthalate (PET) and polyethylene naphthalate (PEN), an acrylate resin, an epoxy resin, a fluorine resin, a silicone resin, a polycarbonate resin, a diacetate resin, a triacetate resin, a polyarylate resin, a polyvinyl chloride, a polysulfone resin, a polyether sulfone resin, a polyimide resin, a polyamide resin, a polyolefin resin, a cyclic polyolefin resin, etc., the films having a thickness of 50 to 300 μm. The base material may be provided with a publicly known layer, such as an easily adhering layer.

The optically transparent conductive material of the present invention may be provided with a publicly known layer, such as a hard coating layer, an antireflection layer, an adhesive layer, an antiglare layer, etc. on the metal pattern (on the distant side from the base material) or on the base material (on the opposite side to the side having the sensor part and the dummy part) as needed. Between the base material and the metal pattern, a publicly known layer, such as a physical development nuclei layer, an easily adhering layer, and an adhesive layer may be provided.

EXAMPLES

Hereinafter, the present invention will be illustrated in more detail by Examples, but the present invention is not limited thereto unless it goes beyond the technical scope of the invention.

Example 1

As a base material, a 100-μm-thick polyethylene terephthalate film was used. The total light transmittance of this base material was 91%.

Next, in accordance with the following formulation, a physical development nuclei coating liquid was prepared, applied onto the base material, and dried to provide a physical development nuclei layer.

<Preparation of Palladium Sulfide Sol>

| Liquid A | Palladium chloride | 5 g |
| | Hydrochloric acid | 40 mL |
| | Distilled water | 1000 mL |
| Liquid B | Sodium sulfide | 8.6 g |
| | Distilled water | 1000 mL |

Liquid A and Liquid B were mixed with stirring for 30 minutes, and then passed through a column filled up with an ion exchange resin to give a palladium sulfide sol.

<Preparation of Physical Development Nuclei Coating Liquid>

Per $m^2$ of Silver Halide Photosensitive Material

| | |
|---|---|
| The above-prepared palladium sulfide sol | 0.4 mg |
| 2 mass % glyoxal aqueous solution | 0.2 mL |
| Surfactant (S-1) | 4 mg |
| Denacol Ex-830 | 50 mg |
| (Polyethlene glycol diglycidyl ether made by Nagase Chemtex Corp.) | |
| 10 mass % SP-200 aqueous solution | 0.5 mg |
| (Polyethyleneimine made by Nippon Shokubai Co., Ltd.; average molcular weight: 10,000) | |

Subsequently, an intermediate layer, a silver halide emulsion layer, and a protective layer, of which the compositions are shown below, were applied in this order (from closest to the base material) onto the above physical development nuclei layer, and dried to give a silver halide photosensitive material 1. The silver halide emulsion was produced by a general double jet mixing method for photographic silver halide emulsions. The silver halide emulsion was prepared using 95 mol % of silver chloride and 5 mol % of silver bromide so as to have an average particle diameter of 0.15 μm. The obtained silver halide emulsion was subjected to gold and sulfur sensitization using sodium thiosulfate and chloroauric acid by the usual method. The silver halide emulsion obtained in this way contained 0.5 g of gelatin per gram of silver.

<Composition of Intermediate Layer/per $m^2$ of Silver Halide Photosensitive Material>

| | |
|---|---|
| Gelatin | 0.5 g |
| Surfactant (S-1) | 5 mg |
| Dye 1 | 50 mg |

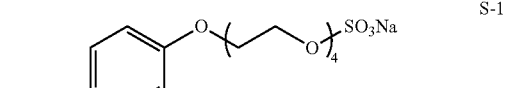

S-1

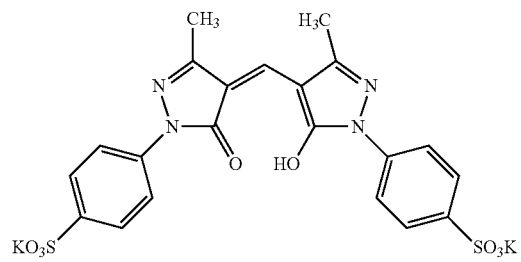

Dye 1

<Composition of Silver Halide Emulsion Layer/Per m² of Silver Halide Photosensitive Material>

| Gelatin | 0.5 g |
|---|---|
| Silver halide emulsion | Equivalent of 3.0 g of silver |
| 1-phenyl-5-mercaptotetrazole | 3 mg |
| Surfactant (S-1) | 20 mg |

<Composition of Protective Layer/Per m² of Silver Halide Photosensitive Material>

| Gelatin | 1 g |
|---|---|
| Amorphous silica matting agent (average particle diameter: 3.5 μm) | 10 mg |
| Surfactant (S-1) | 10 mg |

The silver halide photosensitive material obtained as above was brought into close contact with a transparent manuscript having the pattern shown in FIG. 1, and exposure was performed, through a resin filter which cuts off light of 400 nm or less, using a contact printer having a mercury lamp as a light source. In the transparent manuscript, the patterns of the sensor part 11 and the dummy part 12 are both composed of a lattice mesh composed of lozenge-shaped unit graphics having a line width of 5 μm, a side length of 300 μm, and a smaller interior angle of 60°. As shown in FIG. 2, the dummy part 12 is composed of a pattern which is discontinuous with the pattern of the sensor part 11 and is displaced 20 μm along the imaginary boundary line R. In the pattern of FIG. 1, there exists the dummy part 12 that is surrounded by the sensor part 11. In the corresponding part of the transparent manuscript, the pattern in the portion of the dummy part having entered the sensor part 11 is deleted, and the gap produced by the displacement is supplemented with a pattern retaining the repetition of the unit lattice constituting the dummy part.

After the silver halide photosensitive material was immersed in the diffusion transfer developer shown below at 20° C. for 60 seconds, the silver halide emulsion layer, the intermediate layer, and the protective layer were washed off with warm water at 40° C., and a drying process was performed. In this way, an optically transparent conductive material 1 having the silver pattern of FIG. 1 was obtained. The silver pattern of the obtained optically transparent conductive material 1 had exactly the same line width and line interval as those of the transparent manuscript. The film thickness of the metal pattern measured with a confocal microscope was 0.1 μm.

<Composition of Diffusion Transfer Developer>

| Potassium hydroxide | 25 g |
|---|---|
| Hydroquinone | 18 g |
| 1-Phenyl-3-pyrazolidone | 2 g |
| Potassium sulfite | 80 g |
| N-methylethanolamine | 15 g |
| Potassium bromide | 1.2 g |

Water was added to make the total volume of 1000 mL, and the pH was adjusted to 12.2.

Example 2

The same procedure was performed as in Example 1 except for using a transparent manuscript having the pattern of FIG. 1 where, as shown in FIG. 4, regarding the dummy part 12 not surrounded by a sensor part, the pattern of the upper dummy part 12, which pattern is discontinuous with the pattern of the sensor part 11, is displaced 20 μm to the right along the imaginary boundary line R, and the pattern of the lower dummy part 12, which pattern is discontinuous with the pattern of the upper dummy part 12, is displaced 20 μm to the left along the imaginary boundary line U, and an optically transparent conductive material 2 was obtained.

Comparative Example 1

Figure 5:
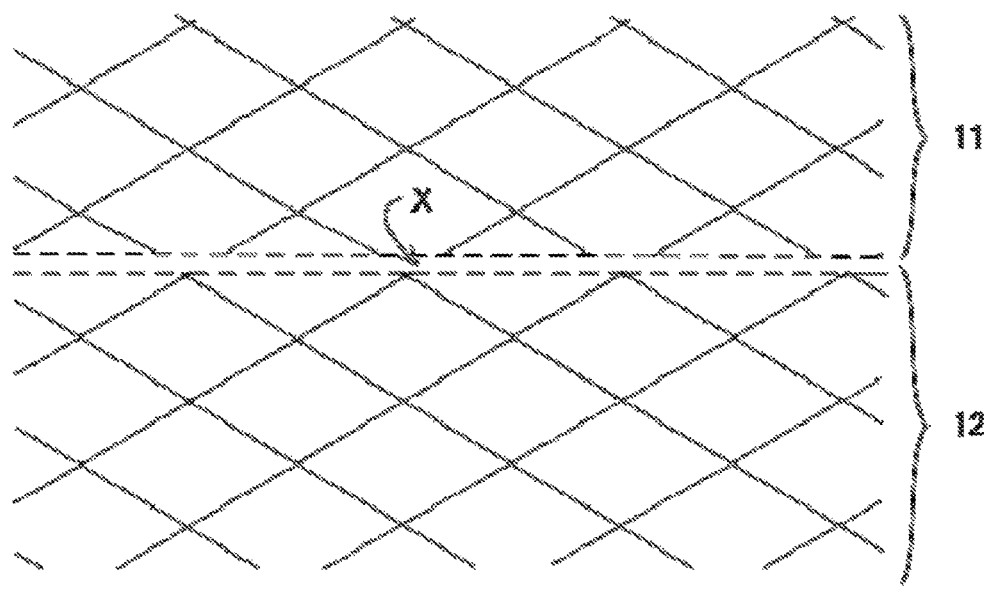
FIG. 5 is an enlarged view showing a part of the optically transparent conductive material used in Comparative Example, the material having a non-image area.

The same procedure was performed as in Example 1 except for using a transparent manuscript having the same pattern as that of FIG. 1 except that the dummy part 12 has a non-image area 20 μm in width (the area between the sensor part 11 and the dummy part 12) at X shown in FIG. 5, and an optically transparent conductive material of Comparative Example 1 was obtained.

Comparative Example 2

The same procedure was performed as in Example 1 except for using a transparent manuscript having the same pattern as that of FIG. 1 except that the dummy part 12 has dots with a radius of 2.5 μm randomly arranged at a density of 39 dots in 10000 μm² instead of the lozenge-shaped lattice mesh, and an optically transparent conductive material of Comparative Example 2 was obtained.

The visibility and the reliability of the optically transparent conductive materials 1 and 2 of the present invention and the optically transparent conductive materials of Comparative Examples 1 and 2 obtained as above were evaluated. The results are shown in Table 1. The visibility was evaluated as follows. The obtained optically transparent conductive material was put on a light table, and the boundary between the sensor part and the dummy part was examined. The level at which the boundary is obvious from a distance of about 50 cm was defined as 1, the level at which the boundary is noticeable as a result of careful observation from a distance of about 50 cm was defined as 2, the level at which the boundary is barely noticeable as a result of staring from a distance of about 20 cm was defined as 3, and the level at which the boundary is unnoticeable from a distance of 20 cm was defined as 4. The reliability was evaluated as follows. For each of the four kinds, 100 sheets of the optically transparent conductive material were prepared. The electrical continuity between the right terminal part 15 and the left terminal part 15 in the pattern of FIG. 1 was checked, and the number of sheets having continuity between terminals in inappropriate combination was used as the evaluation value.

TABLE 1

| | Visibility | Reliability |
|---|---|---|
| Optically transparent conductive material 1 of the present invention | 4 | 10 |
| Optically transparent conductive material 2 of the present invention | 4 | 0 |
| Optically transparent conductive material of Comparative Example 1 | 3 | 30 |
| Optically transparent conductive material of Comparative Example 2 | 2 | 0 |

Table 1 shows that the optically transparent conductive materials 1 and 2 of the present invention have low visibility and reduced occurrence of short circuit, which clearly shows that the present invention can provide an optically transparent conductive material which has low visibility and reduced occurrence of short circuit and therefore is suitable as an optically transparent electrode for projected capacitive touchscreens.

REFERENCE SIGNS LIST

1 Optically transparent conductive material
2 Base material
11 Sensor part
12 Dummy part
13 Non-image part
14 Wiring part
15 Terminal part
21,22 Unit graphic
R,R2,S,T,U Imaginary boundary line
X Non-image area

The invention claimed is:

1. An optically transparent conductive material having, on a base material, a sensor part composed of a metal pattern electrically connected to a terminal part and a dummy part composed of a metal pattern not electrically connected to the terminal part, the metal pattern of the sensor part and/or the metal pattern of the dummy part being displaced along a first imaginary boundary line dividing the sensor part and the dummy part, wherein the sensor part comprises the metal pattern having a repeated unit graphic and the dummy part comprises the metal pattern having the repeated unit graphic, the unit graphic of the metal pattern of the sensor part is congruent in size and shape to the unit graphic of the metal pattern of the dummy part, the unit graphic being a square or a lozenge with an interval between parallel sides of one unit graphic being 400 μm or less, the metal pattern of the sensor part and the metal pattern of the dummy part do not overlap, and no area without any metal pattern exists between the metal pattern of the sensor part and the metal pattern of the dummy part.

2. The optically transparent conductive material of claim 1, wherein the line width of the metal pattern is 1 to 10 μm.

3. The optically transparent conductive material of claim 1, wherein the distance of displacement of the metal pattern of the dummy part, which metal pattern is discontinuous with the metal pattern of the sensor part such that the metal pattern of the sensor part shifts to the metal pattern of the dummy part, along the first imaginary boundary line is equal to or more than the line width of each side constituting the unit graphic of the dummy part and the sensor part and equal to or less than 100 μm.

4. The optically transparent conductive material of claim 1, wherein the distance of displacement of the metal pattern of the dummy part, which metal pattern is discontinuous with the metal pattern of the sensor part such that the metal pattern of the sensor part shifts to the metal pattern of the dummy part, along the first imaginary boundary line is equal to or more than 1.5 times the line width of each side constituting the unit graphic of the dummy part and the sensor part and equal to or less than 40 μm.

5. The optically transparent conductive material of claim 1, wherein the metal pattern of the dummy part in an area is displaced along a second imaginary boundary line dividing the dummy part into multiple areas, relative to the other area sharing the boundary line.

6. The optically transparent conductive material of claim 1, wherein the metal pattern of the sensor part consists of metal, and the metal pattern of the dummy part consists of metal.

* * * * *